(12) United States Patent
Togo et al.

(10) Patent No.: US 6,175,573 B1
(45) Date of Patent: Jan. 16, 2001

(54) MULTI MEDIA DATA STORING AND TRANSMITTING METHOD AND SYSTEM USING THE SAME

(75) Inventors: Tsutomu Togo; Hiroichi Egawa, both of Kawasaki (JP)

(73) Assignee: Fujitsu Limited, Kanagawa (JP)

( * ) Notice: Under 35 U.S.C. 154(b), the term of this patent shall be extended for 0 days.

(21) Appl. No.: 08/940,478

(22) Filed: Sep. 30, 1997

(30) Foreign Application Priority Data

Dec. 5, 1996 (JP) .................................................... 8-325140

(51) Int. Cl.[7] ................................ H04J 3/24; H04N 7/01
(52) U.S. Cl. .................... 370/474; 370/487; 370/471; 348/9; 348/441
(58) Field of Search .................................. 370/471, 394, 370/477; 348/9, 441

(56) References Cited

U.S. PATENT DOCUMENTS 5,801,781 * 9/1998 Hiroshima et al. ................... 348/441
5,859,660 * 1/1999 Perkins et al. ............................ 348/9
5,886,995 * 3/1999 Arsenault et al. ..................... 370/477

* cited by examiner

*Primary Examiner*—Hassan Kizou
*Assistant Examiner*—John Pezzlo
(74) *Attorney, Agent, or Firm*—Helfgott & Karas, P.C.

(57) ABSTRACT

A multimedia data storing and transmitting method and a device using the method may improve flexibility and accuracy of reproduction of a multimedia data stream in a reception terminal, when a multimedia data storage device transmits the multimedia data stream. The multimedia data storing and transmitting method includes the steps of making a set of moving picture data, sound data, and multiplexed information of the moving picture data and the sound data into a packet, distinguishing a data packet of the moving picture data, the sound data, and the multiplexed information from a header packet of the moving picture data, the sound data, and the multiplexed information, storing the distinguished data packet and header packet, and transmitting the stored data packet following the stored header packet.

17 Claims, 18 Drawing Sheets

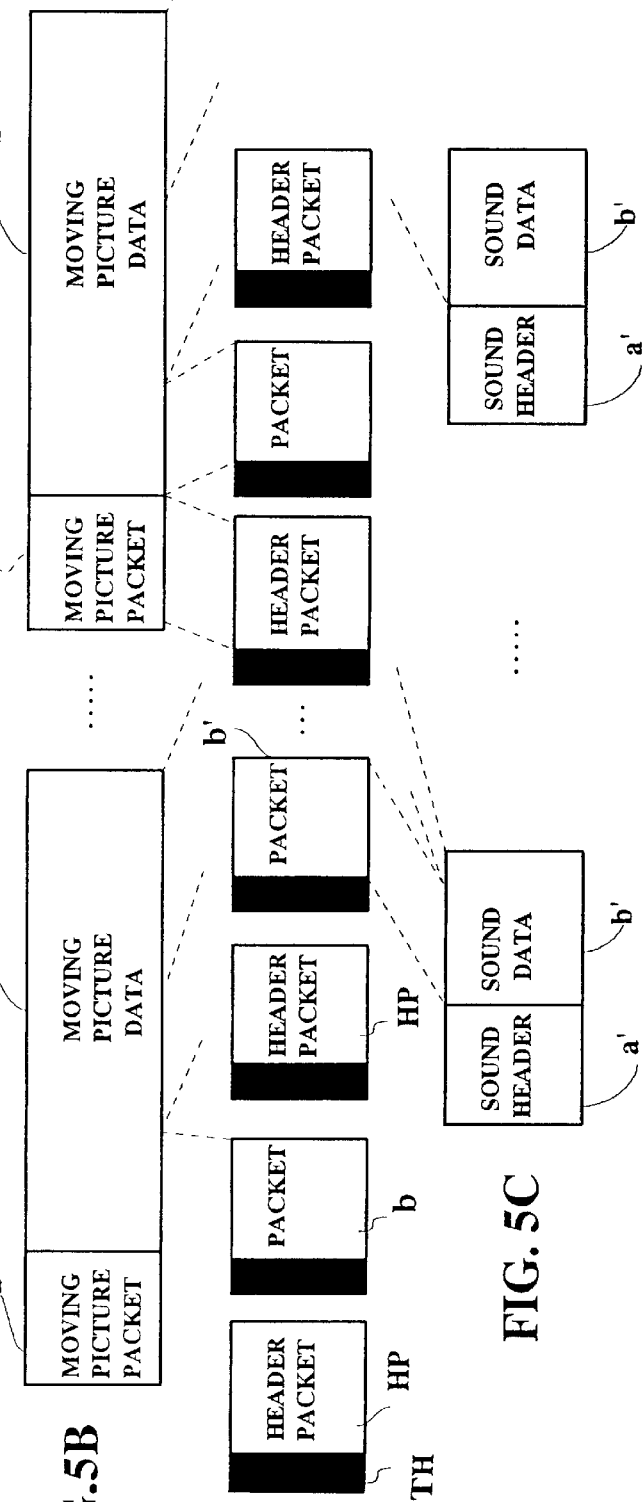
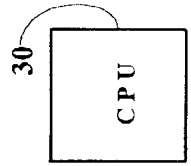
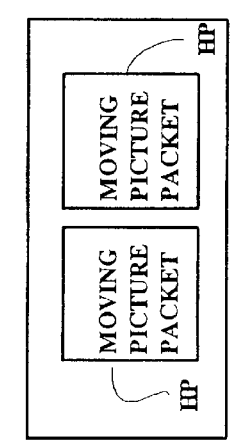
FIG. 5A
FIG. 5B
FIG. 5C
FIG. 5D

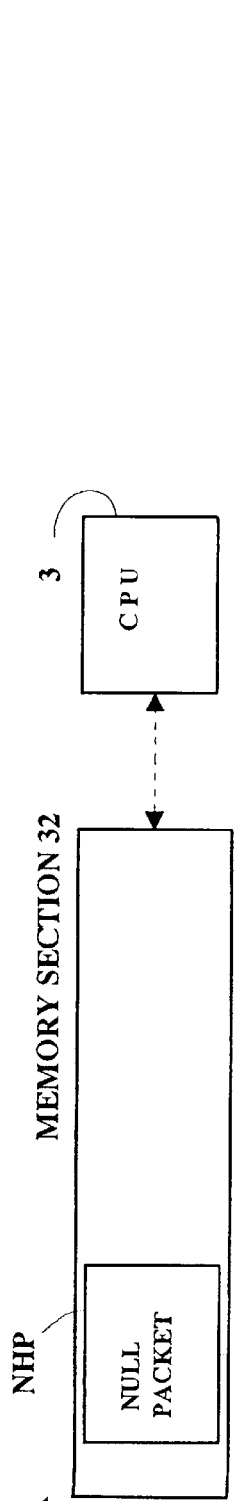
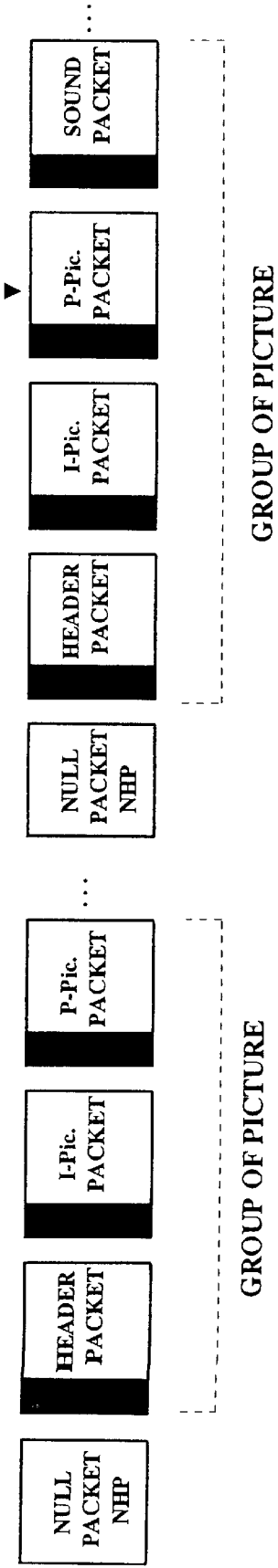
FIG. 18A
FIG. 18B

MULTI MEDIA DATA STORING AND TRANSMITTING METHOD AND SYSTEM USING THE SAME

BACKGROUND OF THE INVENTION

1. Field of the Invention

The present invention relates to a method for storing and transmitting moving picture data, sound data and the multiplexed data of the moving picture data and sound data and a device using the method.

2. Description of the Related Art

In recent years, according to high transmitting speed of transmission devices and high performance of reception terminals, multimedia services, such as on-demand system have been demanded, which store moving picture data, sound data and the multiplexed data of the moving picture data and sound data (hereinafter, it is referred as multimedia data) in storage devices and transmit to the multimedia data to reception terminals via a transmitter upon requests from the reception terminals.

To perform such a service flexibly and smoothly, it is required to consider contents and characteristics of the transmitter, when storing multimedia data in a storage device. It is also required to read out and transmit the multimedia data from the storage device according to various kinds of requirements sent from the reception terminals as preventing errors or minimizing the errors.

When generating multimedia data, a method for converting the multimedia data into packets for a predetermined unit and for storing the packets in the multimedia data storage device has been used.

When multimedia data is converted into packets, a packet is formed with a header, in which multimedia data information (specific information as to data length and compressing method) is described, and the multimedia data provided after the header.

Therefore, when transmitting multimedia data, which is read out from the multimedia data storage device, via a transmitter, the header information and the multimedia data coexist in one packet, and are sent out as they are.

Additionally, it is assumed to insert commercial data and the like in a multimedia data stream. For this case, it is necessary to switch the multimedia data to the commercial data while the multimedia data is transmitted. In this case, it is also required to dynamically transmit a packet information indicating the insertion point of the commercial data from a storage and transmission device to a reception terminal.

After the reception terminal obtains the information of the insertion point, and the reception terminal is initialized, it is necessary to retransmit the multimedia data from the storage and transmission device, or to compulsorily switch the multimedia data during transmitting.

On the other hand, where the transmission of the multimedia data is broken off, the end of transmitting the multimedia data has been confirmed by the use of a timer and the like.

As described above, when the multimedia data is switched, it is difficult to know a switching point on a reception terminal. It then causes that the replay of the multimedia data would be stopped with errors, or would be fallen into disorder on the reception terminal.

Further, there is a possibility that a timer for recognizing data transmission being broken off malfunctions because of temporary transmission delay, and so on, at the reception terminal.

Furthermore, there have been problems such that the time information as to the multimedia data described in a data stream may differ and that the length of the entire data stream is changed when a header packet is inserted in the data stream on transmission of the multimedia data, which has been generated and stored in a data storage.

SUMMARY OF THE INVENTION

Accordingly, it is an object of the present invention to provide multimedia data storing and transmitting method, and a system using the same to solve the problems in the conventional multimedia data storage device.

Further, other objects of the present invention will become clear by the description for explaining embodiments according to the attached drawings.

BRIEF DESCRIPTION OF THE DRAWINGS

FIGS. 5A to 5D are diagrams for explaining the exchanging of header packets HP.

FIGS. 18A and 18B are diagrams of one embodiment employing an invalid packet (Null packet) NHP.

DESCRIPTION OF THE PREFERRERD EMBODIMENT

Figure 1:
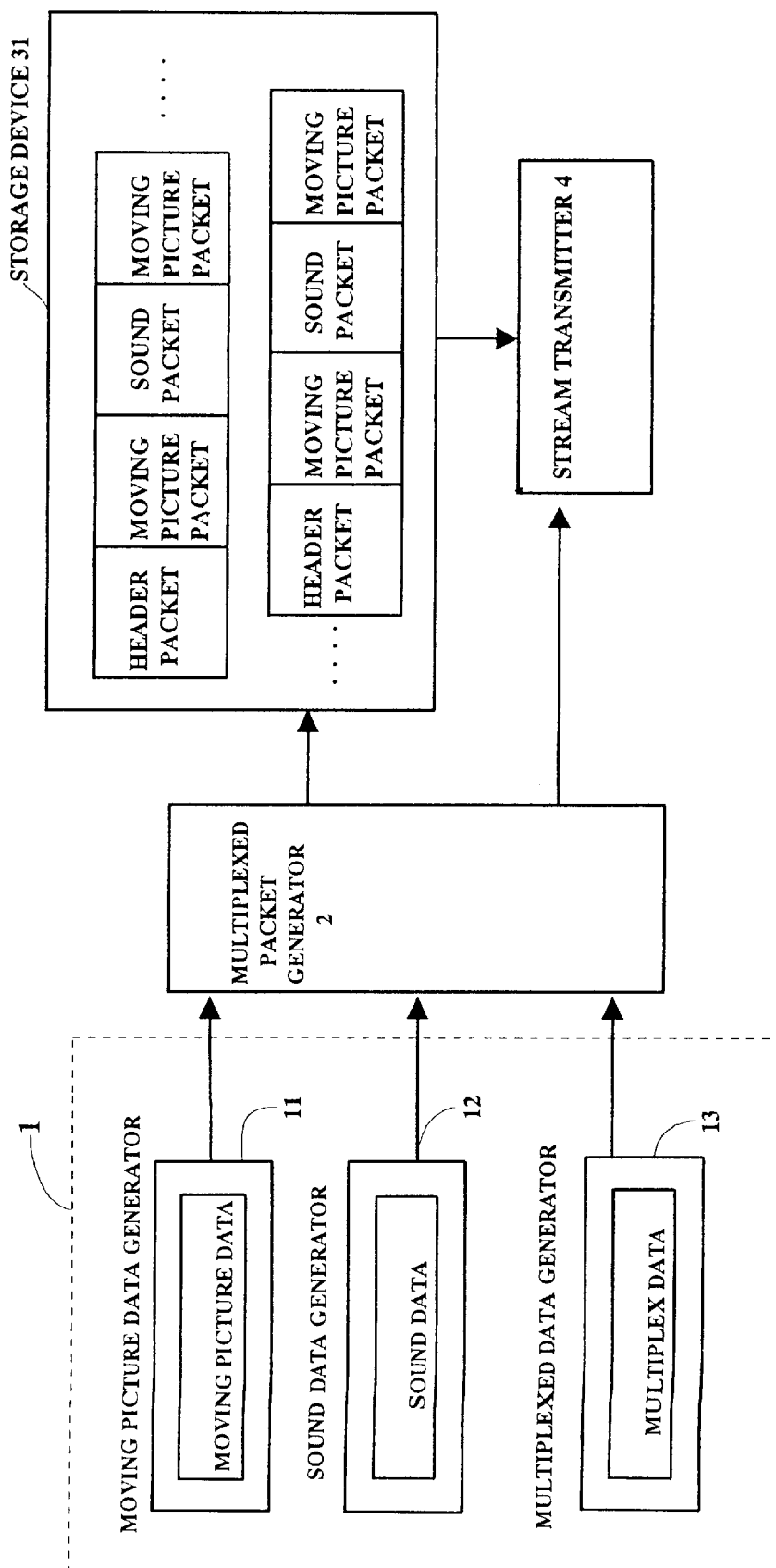
FIG. 1 is a principle diagram of a multimedia data transmitter according to the present invention.

Embodiments of the present invention will be described according to the attached drawings. Throughout the following descriptions, the same reference numerals are used to denote and identify corresponding or identical components.

FIG. 1 is a principle diagram of a first embodiment of a multimedia data transmitter employing the present invention. In FIG. 1, a multimedia data generator 1 includes a moving picture data generator 11, a sound data generator 12, and a multiplexed data generator 13.

The multiplexed data generator 13 generates multiplexed data of the multimedia data.

A multiplexed packet generator 2 generates a multimedia data stream which includes multimedia data formed in packets. Where the multiplexed packet generator 2 forms the multimedia data into packets, it generates only header information as a header packet when the header information of a multiplexed data stream of moving picture data and sound data is generated. Then, the generator 2 stores the header packet to a storage device 31, or transmits it to a data stream transmitter 4.

With this structure, when the multimedia data stream is stored and is transmitted, it becomes possible to treat a header section and a data section of the multimedia data stream, independently.

Figure 2:
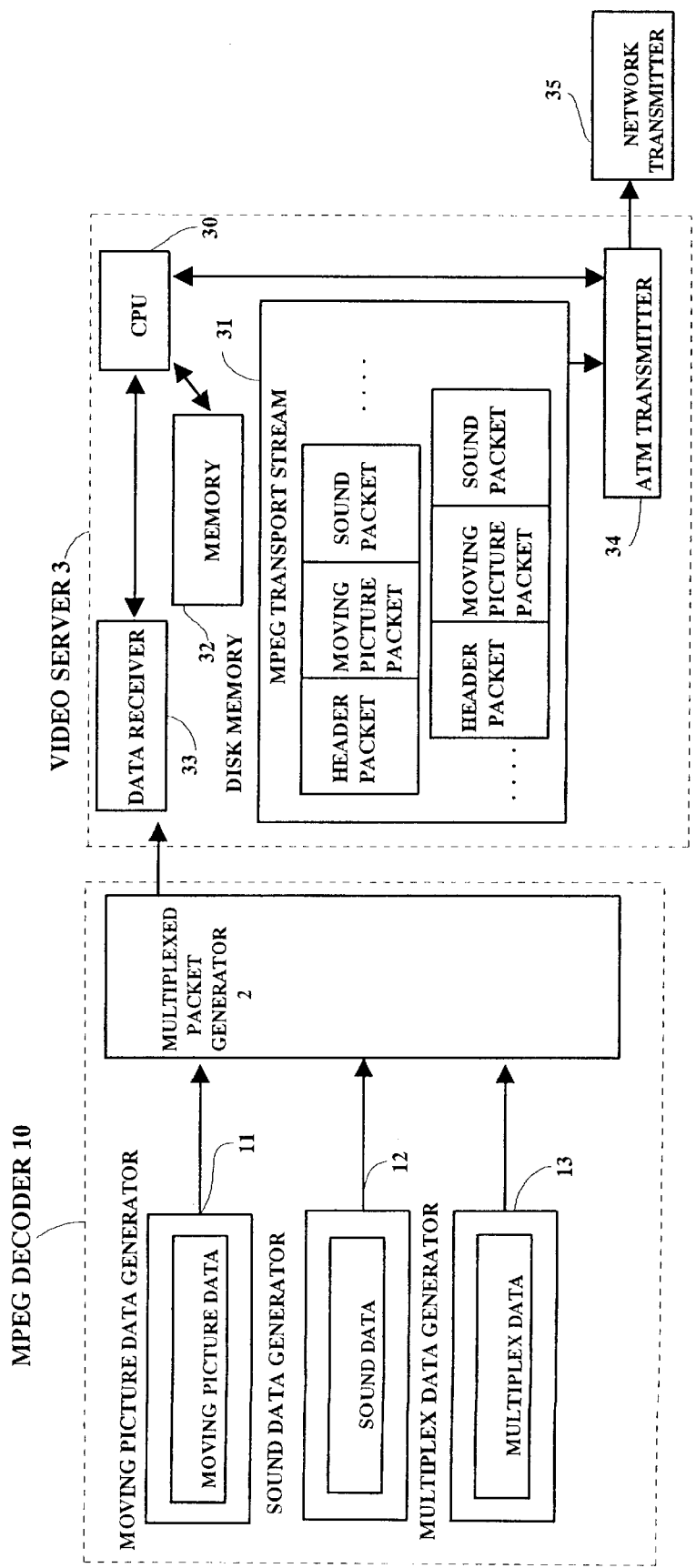
FIG. 2 is a block diagram of an embodiment employing the principle diagram shown in FIG. 1.

FIG. 2 is a block diagram showing one embodiment corresponding to the principle diagram shown in FIG. 1. A MPEG (Moving Picture Expert Group) decoder 10 is formed with a moving picture data generator 11, a sound data generator 12, and a multiplexed data generator 13, which form the multimedia data generator 1, and multiplexed packet generator 2.

The multiplexed packet generator 2 generates a moving picture header and a sound header from the moving picture data of the moving picture generator 11 and the sound data of the sound data generator 12, respectively based on multiplexed data of the multiplexed data generator 13. Then, the generator 2 makes the headers with the moving picture data and the sound data as a set to output them as a packet having a predetermined length, and transmits it to a video server 3, which is used as a multimedia data storage device.

The videoserver 3 includes a CPU 30, a disk memory 31, a working memory 32, an ATM transmitter 34, which transmits a data stream to a network transmitter 35, and a data receiver 33, which has an interface function with the multiplexed packet generator 2.

When transmitting a packet having a fixed length to a transmission path, the multiplexed packet generator 2 makes the moving picture data or the sound data to be transmitted from the moving picture data generator 11 or the sound data generator 12 into a packet having the fixed length. Then, the CPU 30 controls to store the packet into the disk memory 31 in the video server 3.

In this case, if there are a header section, on which multiplexing information output from the multiplexed packet generator 13 is described, a header section, on which coding information for the moving picture data of MPEG is described, or a header section, on which information for the sound data is described, the multiplexed packet generator 2 forms only those headers into packets, i.e., header packets, and transmits them to the video server 3 to store in the disk memory 31 under a control of the CPU 30, as described above.

Accordingly, the disk memory 31 shown in FIG. 2 stores the header packets, the moving picture packets, and the sound packets in order. Then, a moving picture data size, and compression mode are stored in the header packets.

Figure 3:
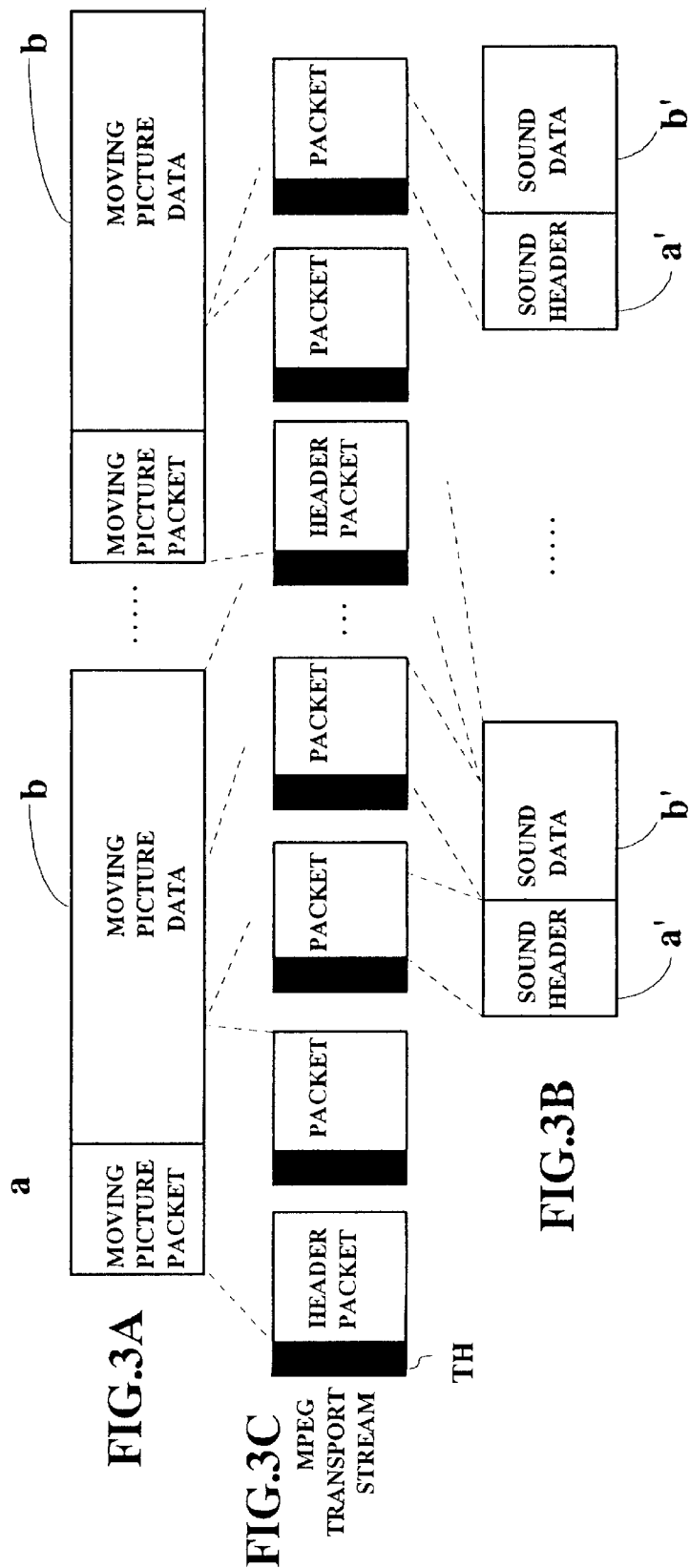
FIGS. 3A to 3C are diagrams for explaining a function of a generator 2 generating multiplexed data.

FIGS. 3A through 3C explain a function of the multiplexed packet generator 2. FIG. 3A shows MPEG data having a moving picture header a and a moving picture data b. FIG. 3B is coded sound data having a sound header a' and a sound data b'.

FIG. 3C shows a structure, in which the MPEG data and the coded sound data are respectively divided into header and data sections, and the sections form independent packets having predetermined lengths. Further, in FIGS. 3A to 3C, TH means a transport header connecting packets.

Figure 4:
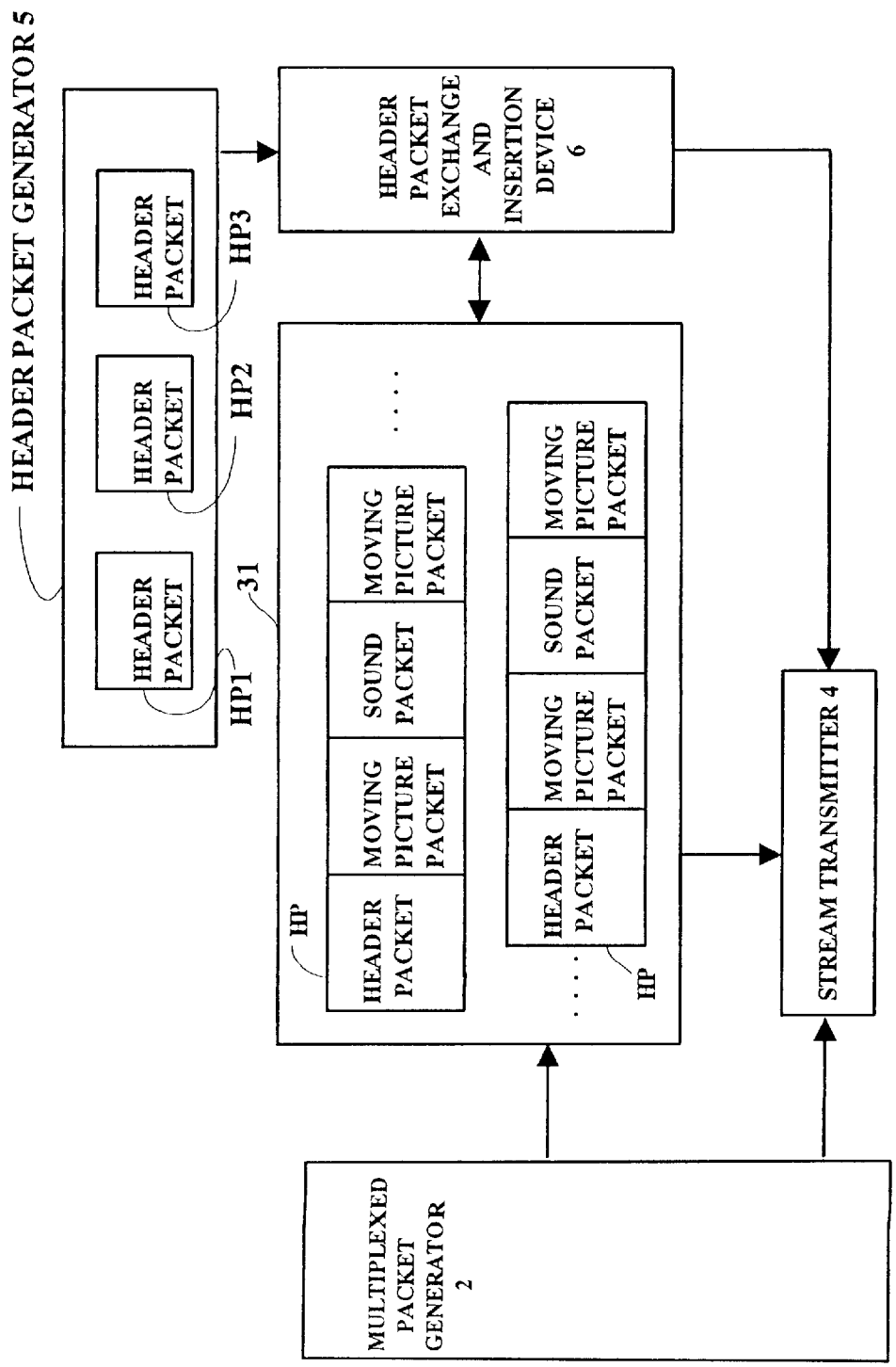
FIG. 4 shows a diagram of an embodiment of the present invention based on the diagrams shown in FIGS. 1 and 2.

FIG. 4 shows a diagram of an applied example of the present invention based on a basic principle structure shown in FIGS. 1 and 2 which are described above. A multimedia data generator 1, which is shown in the principle explanation diagram shown in FIG. 1, is not shown in FIG. 4. On the other hand, a header packet generator 5 and a header packet exchange and insertion device 6 are newly added.

The header packet generator 5 generates only header packet HP independently from the multiplexed packet generator 2. The header packet exchange and insertion device 6 exchanges the header packets HP generated in the header packet generator 5 with the header packets HP in the multimedia data stream, which are generated in the multiplexed packet generator 2 and are stored in the multimedia data storage device or the disk memory 31, and restores the exchanged packets in the disk memory 31.

Alternatively, the header packet exchange and insertion device 6 may exchange the header packets HP when the multimedia data storage device 31 transmits stream data to a stream transmitter 4.

That is, when the multimedia data stream is stored and sent out, it will become possible to exchange header packets separately from the multimedia data.

Further, FIGS. 5A to 5D show an explanatory diagram of the exchange of the header packets HP. In FIGS. 5A to 5D, functions of the header packet generator 5 and the header packet exchange and insertion device 6 shown in FIG. 4 are executed under control of the CPU 30.

That is, the CPU 30 controls to generate the moving picture headers HP and store them to the memory section 32 (FIG. 5A). Further, FIGS. 5B and 5C respectively show moving picture headers and data and sound headers and data, which are outputted from the multiplexed packet generator 2 and are stored in the disk memory 31.

FIG. 5D shows an example that the above-described moving picture headers a in the moving picture header and data or the sound header and data which are stored in the disk memory 31 are replaced with the moving picture headers HP generated under the control of the CPU 30 and stored in the memory section 32.

In FIGS. 5A to 5D, a size of a display screen and a compression mode of data are prescribed in the moving picture header HP. Therefore, it is possible to prescribe an optional size of the display screen and the compression mode of data by the moving picture header generated under the control of the CPU 30 or the independently generated with the header packet generator 5.

If a protocol, such as UDP/IP on LAN, is used on transmission of packets, there is no compensation for packet losses. Therefore, when the packet is dropped before arriving a reception terminal, decoding error is generated on the reception terminal. Accordingly, there is possibility that the moving picture and sound display is interrupted on the reception terminal.

In such the case, there is possibility to reset and recover the reception terminal from the decoding error by transmitting header information of the multimedia data, for example, a sequence start code, at decoding the moving picture data to the reception terminal.

Figures 6A, 6B:
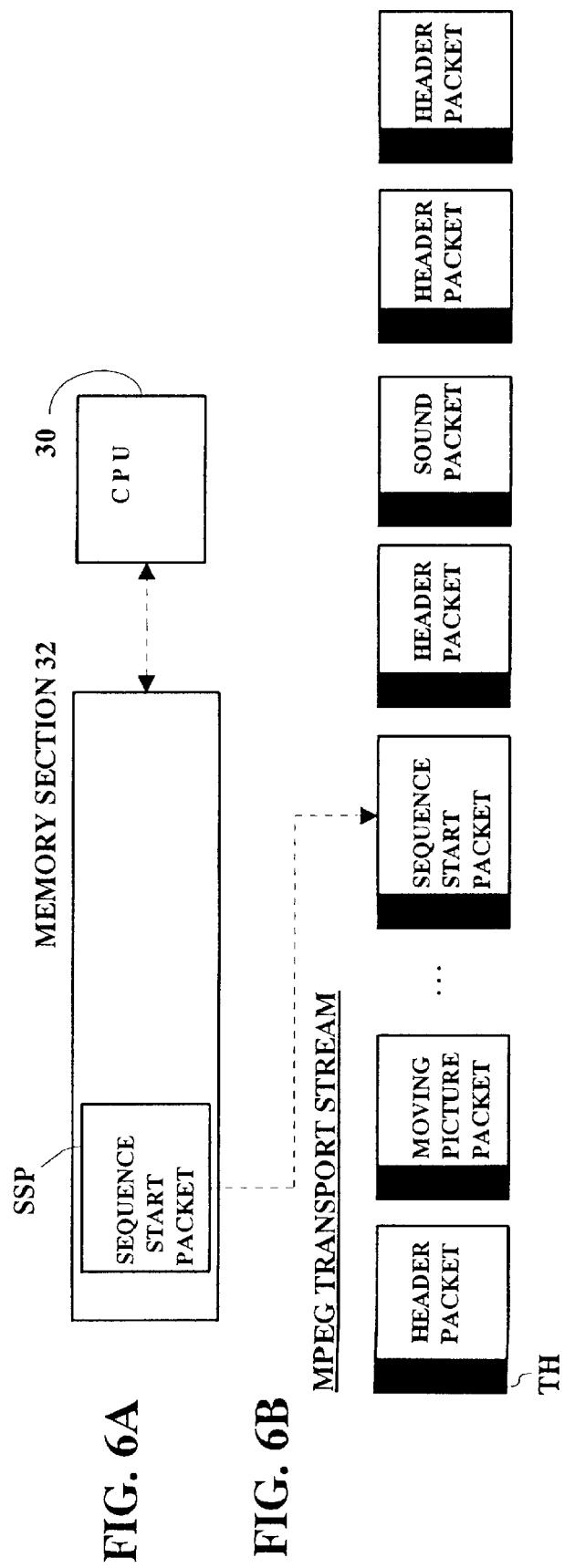
FIGS. 6A and 6B are explanatory diagrams of inserting sequence start packets.

Therefore, as shown in FIGS. 6A and 6B, the CPU 30 generates a header packet, i.e., a sequence start packet SSP, including a sequence start code, and stores it in the memory section 32.

A plurality of sequence start header packets are transmitted per a moving picture group to a transmission path on transmitting data stream. By transmitting a plurality of the sequence start header packets into the transmission path, it may become possible to reduce possibility of losing the sequence start header packets on the transmission path.

Accordingly, it becomes possible to transmit the header packets which are a key data having information required for replaying the multimedia data, even on a network having less quality, in which there is a possibility of packet losses to the reception terminal.

Figure 7:
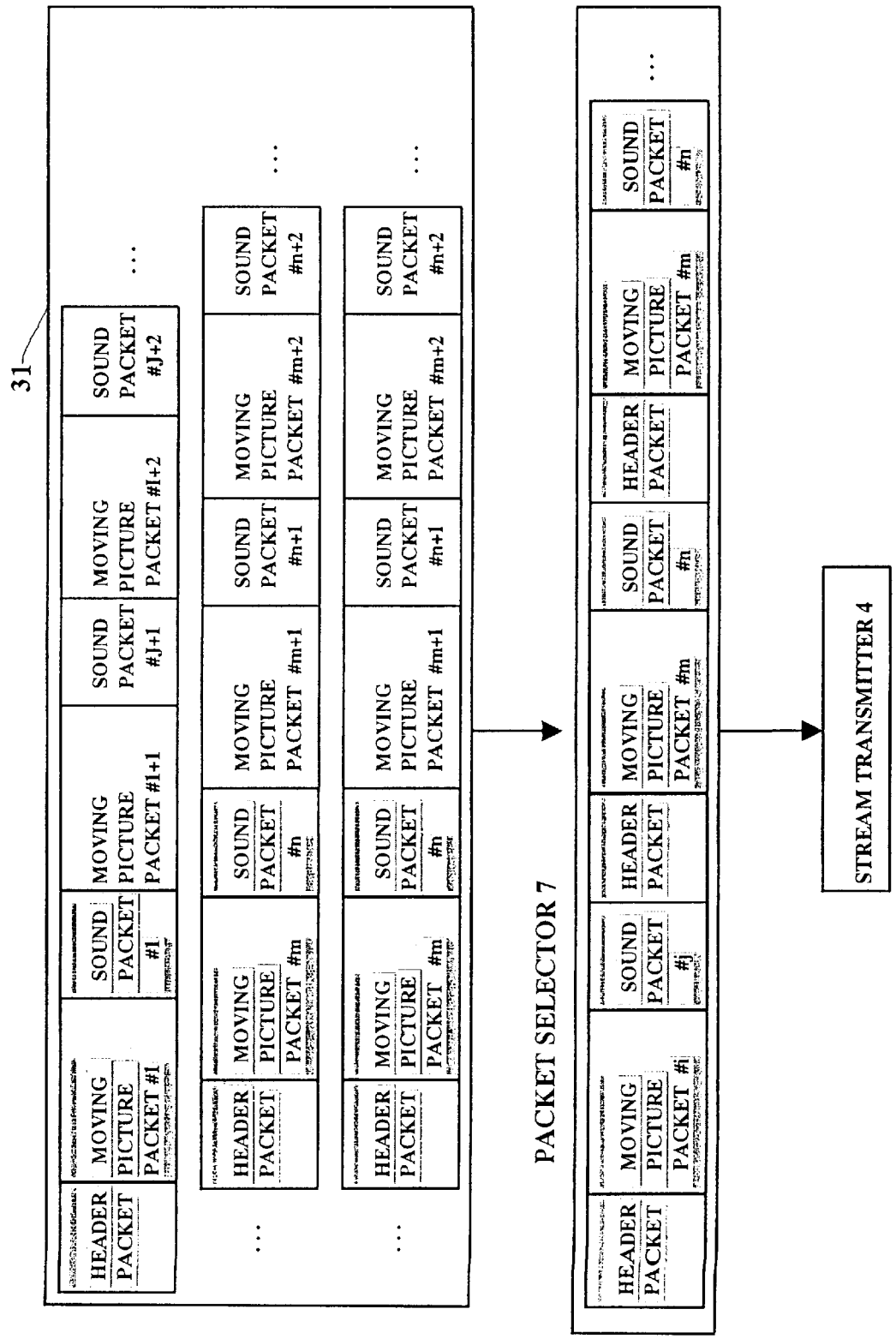
FIG. 7 shows an embodiment of the present invention.

FIG. 7 is a diagram explaining an other example employing the present invention. In this example, a header packet selector 7 is provided. The header packet selector 7 selects packets from the multimedia data stream packets stored in the multimedia data storage device or the disk memory 31 and restructures a stream with the selected packets. Then, the header packet selector 7 transmits the restructured data stream to the data stream transmitter 4.

Therefore, it becomes possible to reproduce the header packets, the selected moving picture data and sound data in the reception terminal, even if a network having a low transmission speed is used. Accordingly, if the moving picture data and sound data are not received in all, it becomes possible to recognize outline of the moving picture data and sound data in the reception terminal.

Figure 8:
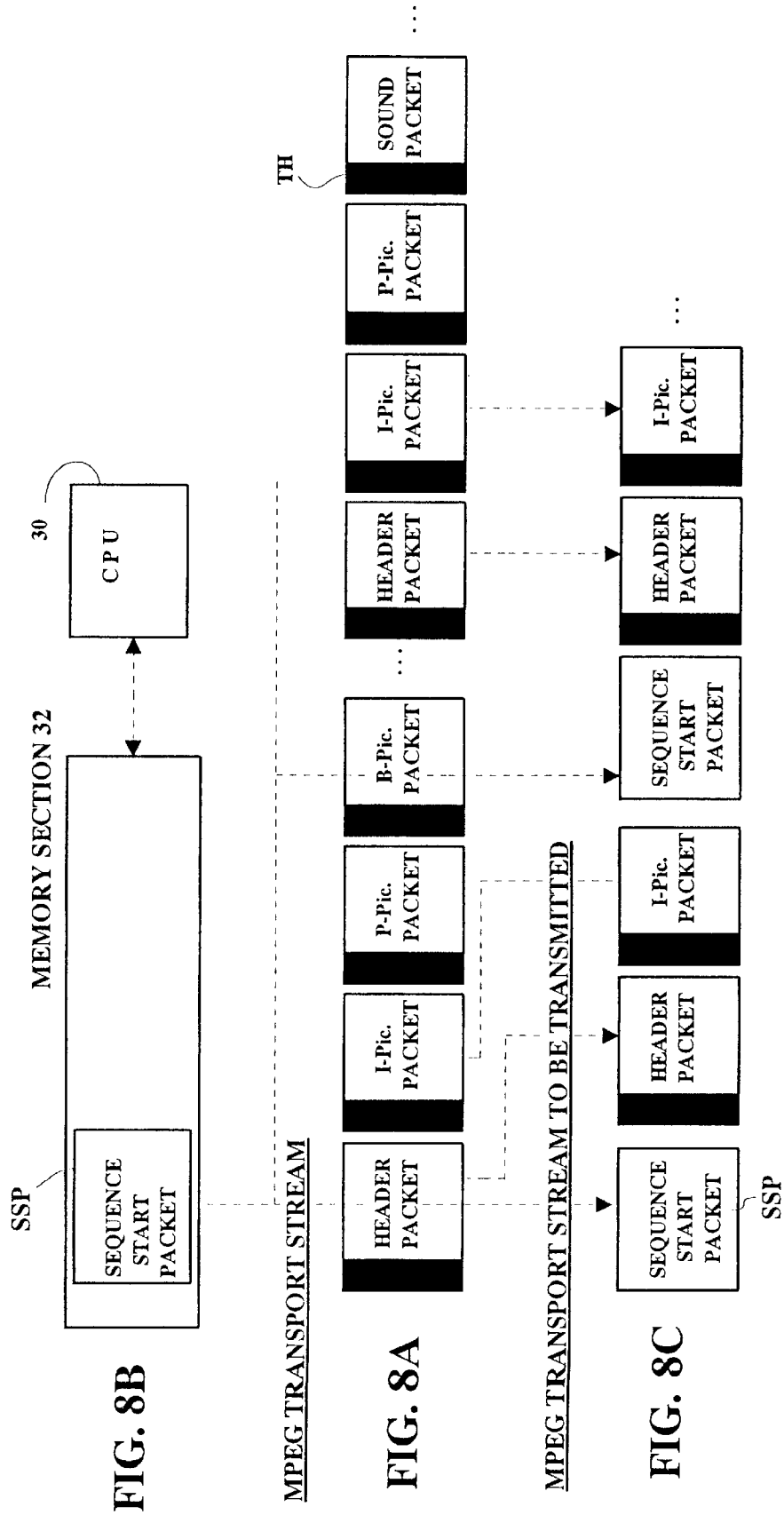
FIGS. 8A to 8C are diagrams for explaining an embodiment of reproducing header packets, moving picture or sound data selected in a reception terminal in a network acted with low transmission speed.

For example, in a network, such as an Ethernet, which has a low speed transmission path, only a packet (I-picture) including a coded data in a frame is selected from a multimedia data stream shown in FIG. 8A stored in the disk memory 31 of the video server 3 per a packet as shown in FIGS. 8A to 8C.

Then, the selected I-Picture packet and the sequence start packet SSP having a sequence start code generated by the CPU 30 and stored in the memory section 32 as shown in FIG. 8B are transmitted to the reception terminal via a network as shown in FIG. 8C. Therefore, it becomes possible to reproduce the moving picture data and sound data in the reception terminal connected to a network in which it is impossible to reproduce the multimedia data stream at a normal speed.

Figure 9:
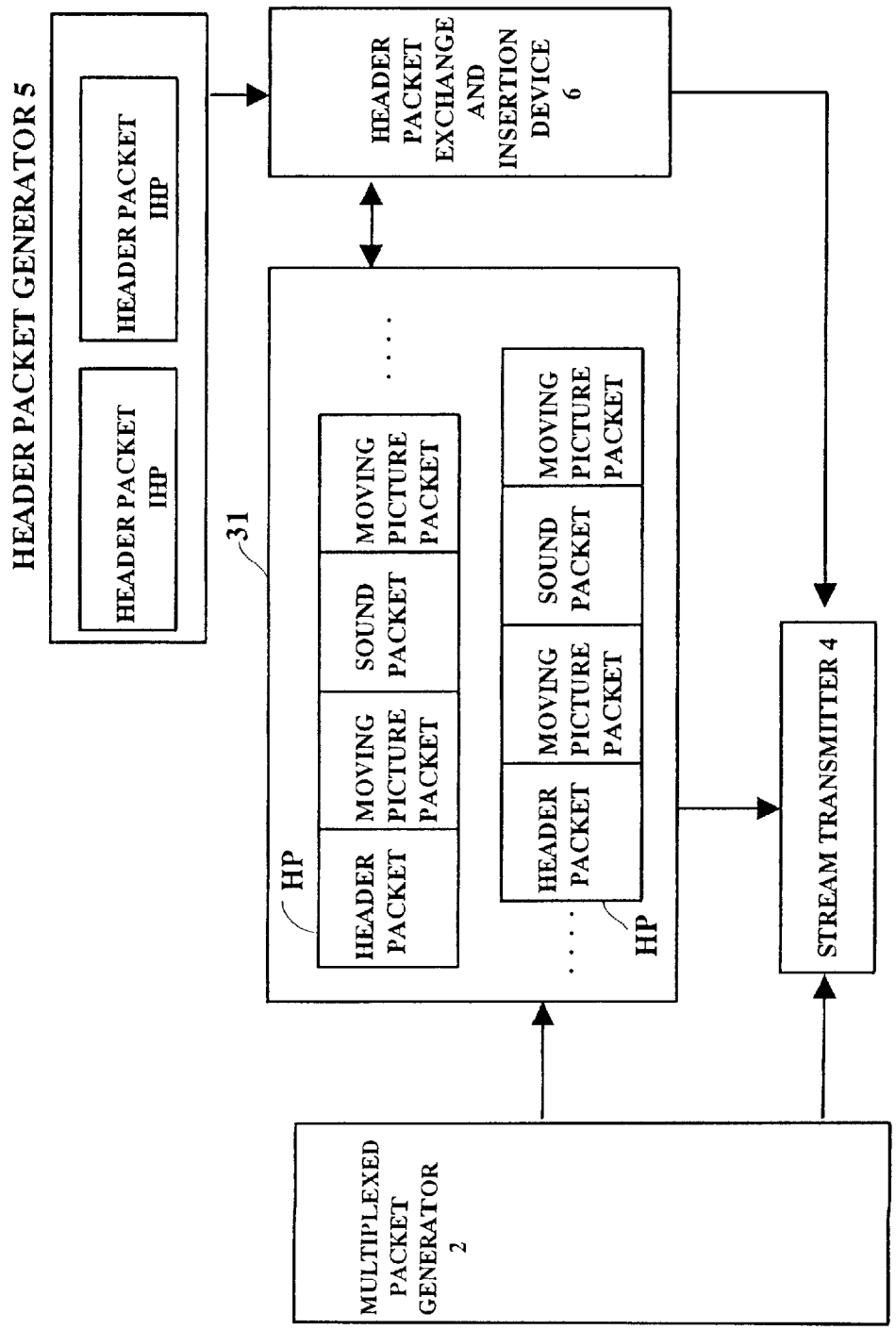
FIG. 9 is an explanatory diagram of one example of the present invention by using of a header packet IHP, to which condition for inhibition of replay of data is added.

FIG. 9 is a principle explanatory diagram of a further example employing the present invention. In the example, reproduction is not performed by setting the specified moving picture data and sound data as invalid data so as to perform pseudo-special reproduction.

In FIG. 9, the header packet generator 5 generates header packets IHP indicating condition for inhibition of reproduction. The header packet IHP is a header packet having information by which a part of the reproduction of the multimedia data is inhibited.

Accordingly, the header packet exchange and insertion device 6 replaces the header packet IHP generated in the header packet generator 5 for a header packet of the multimedia data stream, which is generated by the multiplexed packet generator 2 and is stored in the multimedia data storage device 31.

After exchanging the header packet IHP with the header packet, the exchanged header packet IHP is stored in the multimedia data storage device 31, or is transmitted to the data stream transmitter 4.

In this way, all of the data should be reproduced in the reception terminal, but only valid moving picture data and sound data can be reproduced without reproducing the moving picture data and sound data invalidated by the header packet IHP by exchanging the header packet of the multimedia data. Therefore, it becomes possible to perform pseudo-special reproduction in the reception terminal.

Figure 10:
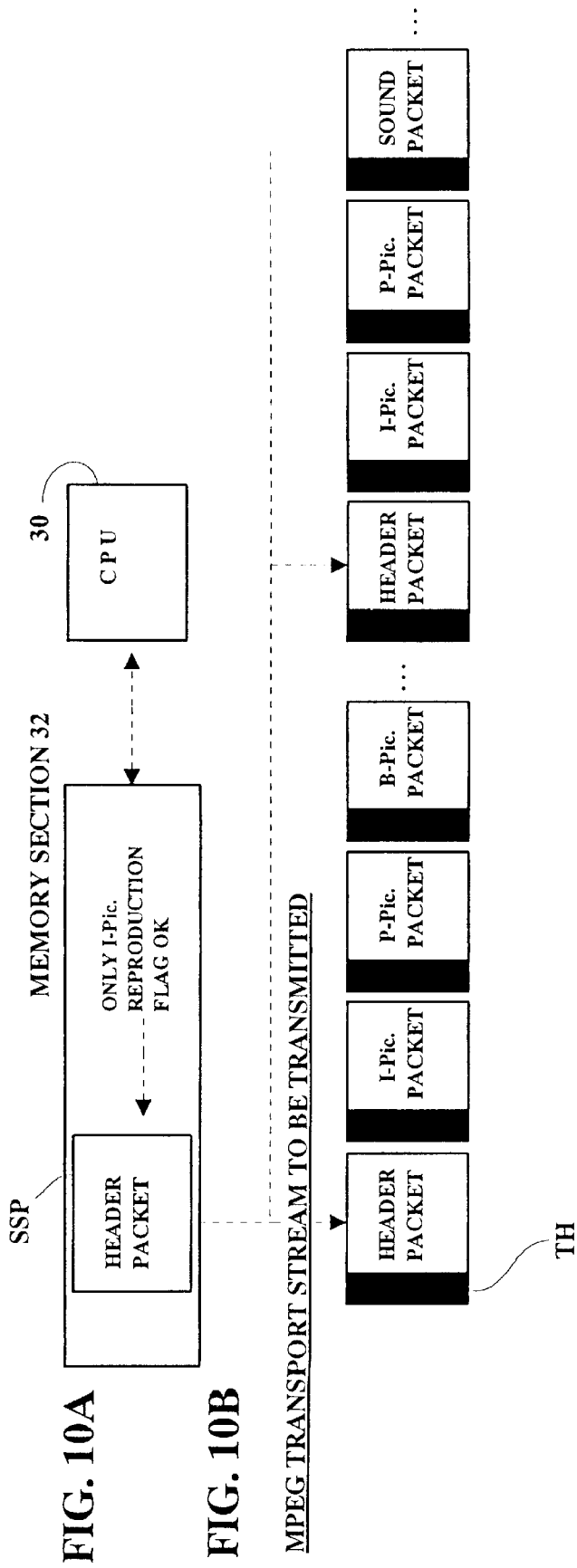
FIGS. 10A and 10B are diagrams of one example of the header packet IHP.

FIGS. 10A and 10B show an example of the above-described header packet IHP. In FIG. 10A, a CPU 30 performs the function of the header packet generator 5, and generates a header packet for instructing to reproduce only the coded inter-frame (I-Picture) as the header packet IHP which includes information for inhibition of reproduction of the specified moving picture data and sound data which are coded inter-frame data.

When the multimedia data stream is transmitted, the header packet of the multimedia data stream is exchanged with the above-described header packet IHP and is transmitted to a network with a high speed. Accordingly, it becomes possible to perform pseudo-special reproduction by sub-sampling the moving picture data and sound data in the reception terminal.

Figure 11:
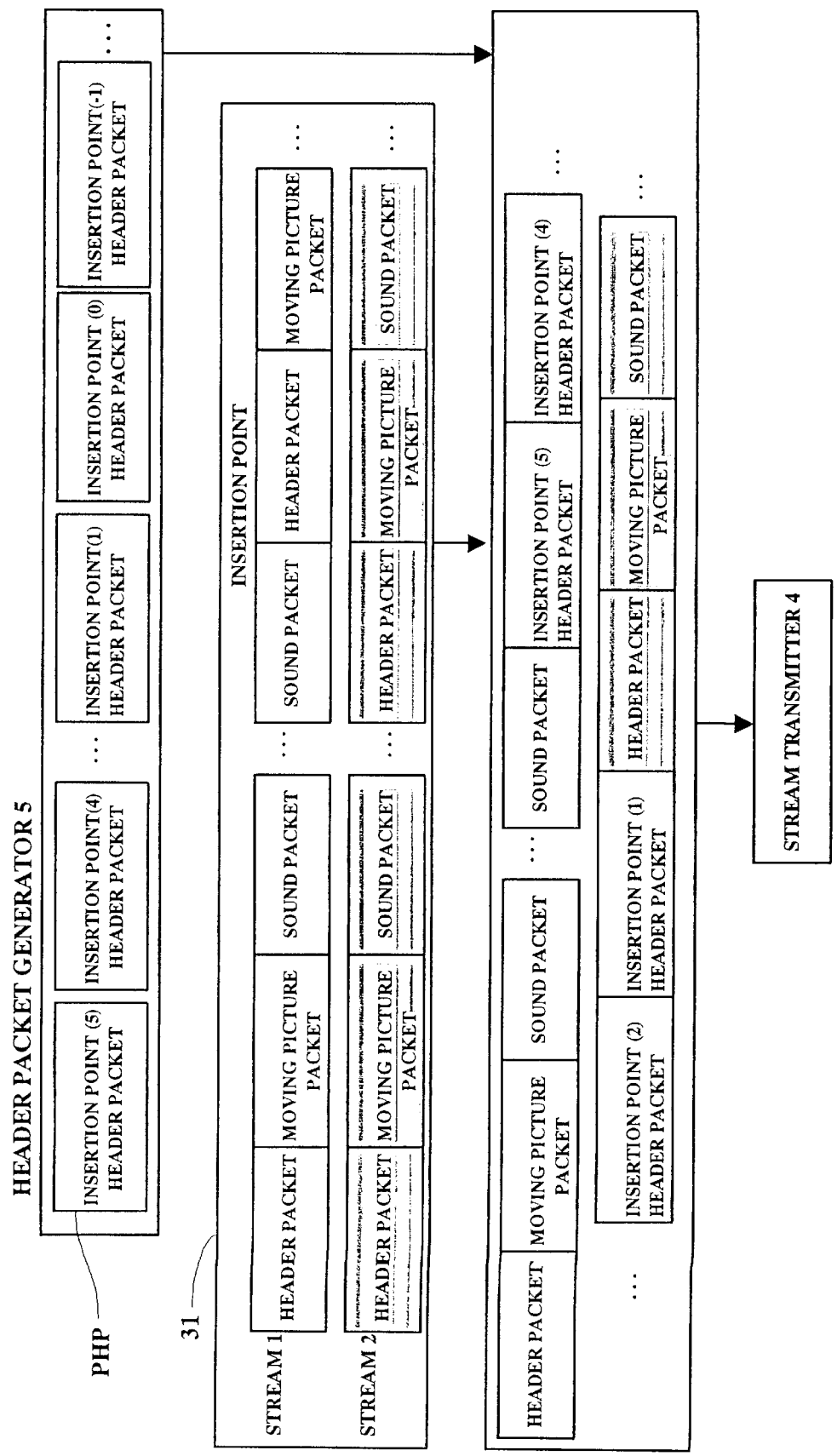
FIG. 11 is a principle diagram of one embodiment of the present invention.

FIG. 11 is an explanatory principle diagram of an example employing the present invention. The example shows the control of replacing or inserting other multimedia data stream by the header packet on transmission of a first multimedia data stream.

That is, when the multimedia data storage device 31 transmits the first multimedia data stream of packets, or the multiplexed packet generator 2 transmits the data stream to the data stream transmitter 4, the second multimedia data stream is inserted or replaced.

In this case, the header packet generator 5 generates the header packet PHP including information of distance to the insertion position. Then, the header packet exchange and insertion device 6 replaces the packet PHP in front and behind positions of the inserted or replaced point of the second multimedia data stream, and transmits it to the data stream transmitter 4.

When the plurality of multimedia data streams are replaced or inserted, the stream transmitter side can insert or replace the packets to an optional place by the use of the header packet PHP, which has information about positions of insertion and replacement, even if information about insertion and replacement is not described in the header packet of the original stream.

In FIG. 11, the header packet generator 5 generates the header packet PHP for instructing insertion position numbers. Then, the header packet exchange and insertion device 6 exchanges the packet of the first stream in the start point where the second stream to be inserted to the first stream required for the number of the packets to be inserted in the second stream with the header packets PHP generated by the header packet generator 5.

Therefore, the stream 2 is inserted into the stream 1 to transmit to the stream transmitter 4.

FIGS. 12A to 12D show an explanatory diagram in the case of inserting a commercial stream, as the second stream, in the multimedia data of the first stream described in FIG. 11.

Figure 12:
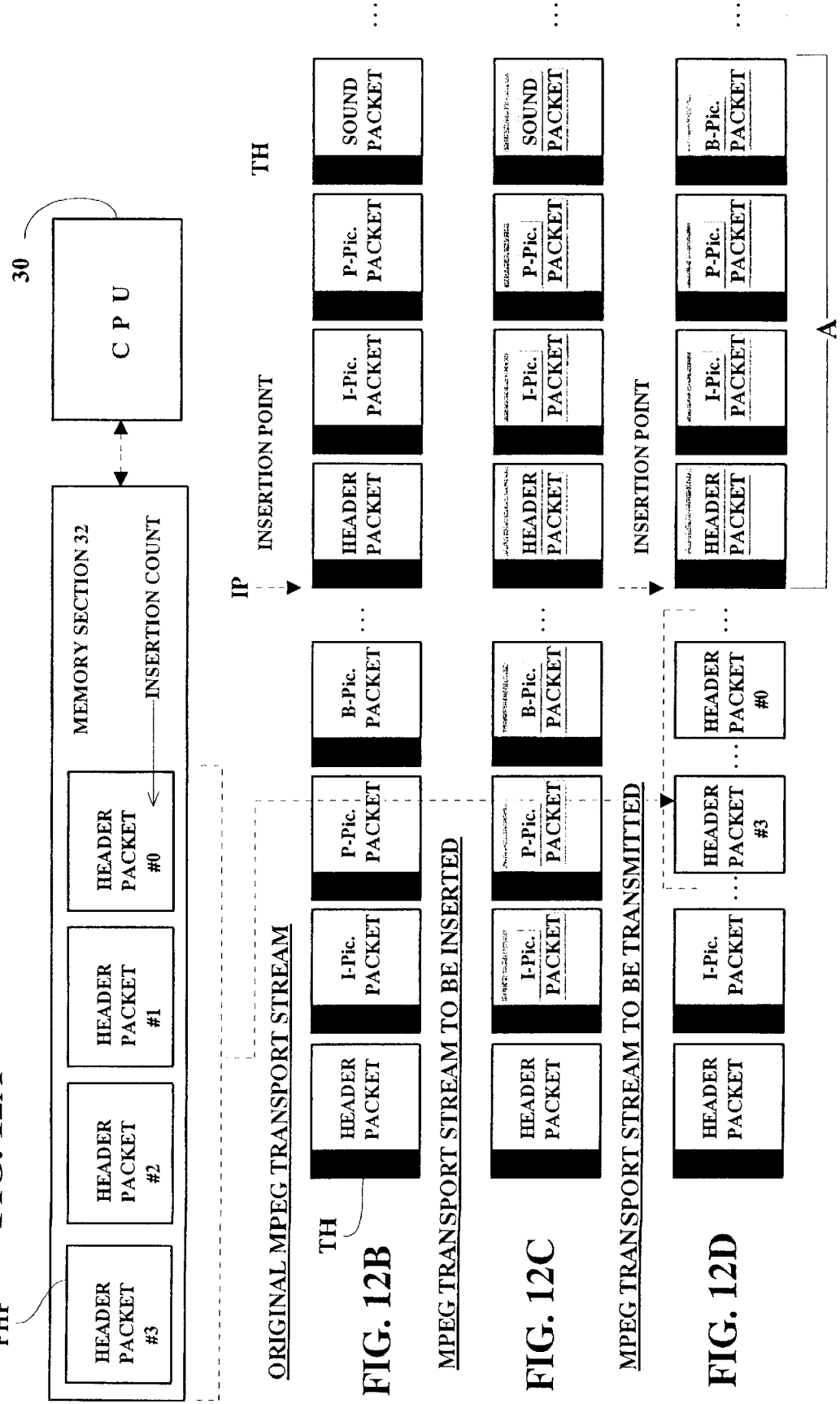
FIGS. 12A to 12D are diagrams of an example where commercial stream, and so on, is inserted into one multimedia data stream, shown in FIG. 11, as the second stream.

The memory 32 stores the header packets PHP instructing insertion counts #0 to #3 required for packets corresponding to the commercial data to be inserted, as shown in FIG. 12A.

FIG. 12B means an original MPEG data stream, which is transmitted from the multiplexed packet generator 2 to the multimedia server 3, and is stored in the disk memory 31.

On the other hand, FIG. 12C is a MPEG data stream of the commercial data to be inserted in the original MPEG data stream. Accordingly, as shown in FIG. 12D, a header packet PHP instructing insertion counts #0 to #3 to an insertion point IP of the original MPEG data stream is inserted.

Then, packets A required for insertion counts #0 to #3, which are indicated by the header packet PHP in the MPEG data stream of the commercial data of FIG. 12C, are inserted and transmitted to the reception terminal side.

In this way, when the commercial stream as shown in FIG. 12C is inserted to the multimedia data (FIG. 12B) stored in the disk memory 31, the header packets PHP which indicate number of packets to be inserted are inserted before the insertion point. Thereby, it becomes possible to instruct the insertion point to the reception terminal.

As described above, when the multimedia data generator 1 or the stream generator 2 transmits the first multimedia data of packets to the data stream transmitter 4, the other multimedia data is inserted and replaced. Then, it is apprehended to reproduce the first multimedia data stream discontinuously transmitted near the insertion or replacement point.

Figure 13:
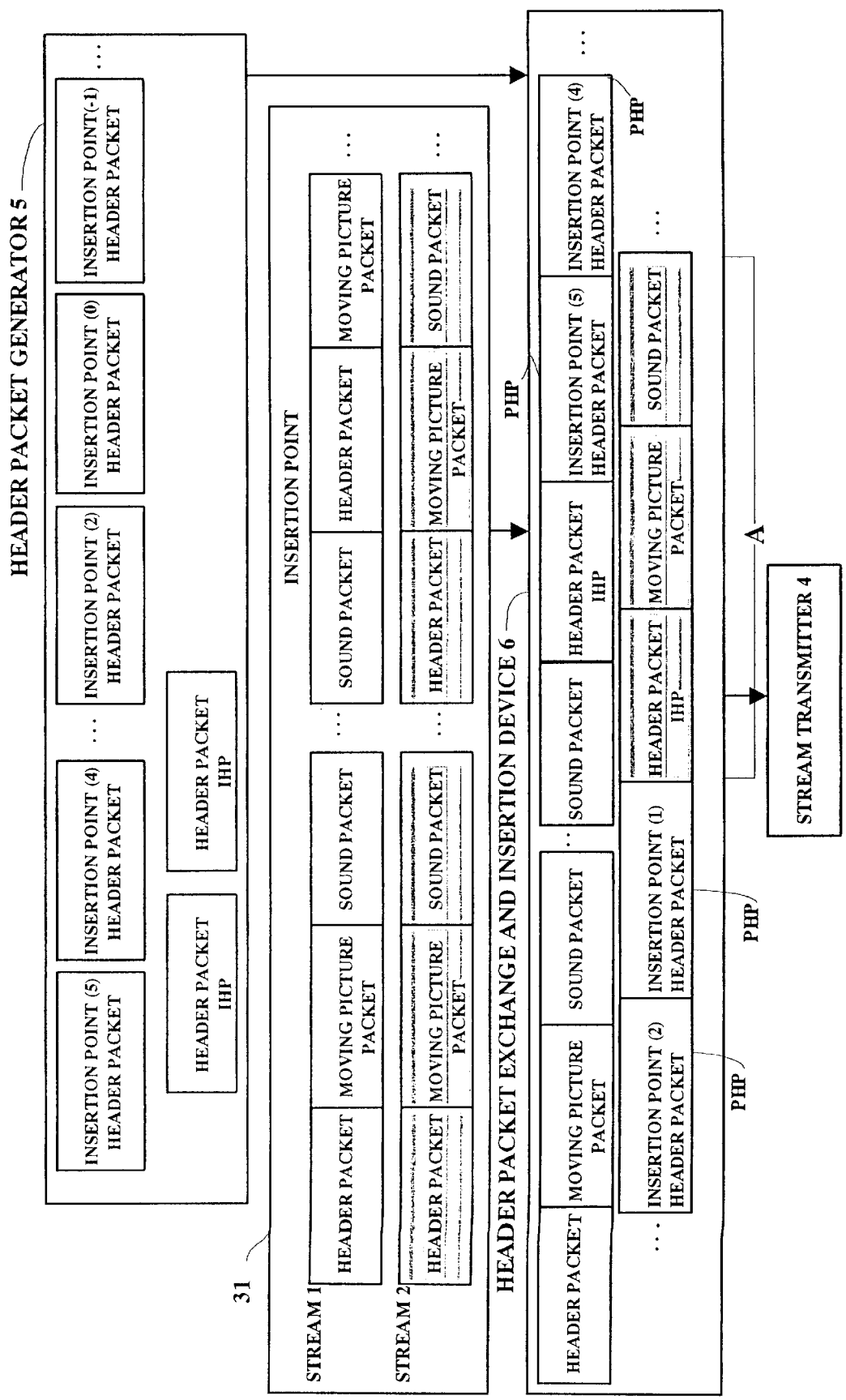
FIG. 13 is a diagram of an example of solving a problem of discontinuous replay of the data when other data streams are inserted into one multimedia data stream.

FIG. 13 is a diagram for explaining an example to solve such the problem. As the same as the example shown in FIG. 11, the multimedia data storage device 31 stores the first and second multimedia data streams.

On the other hand, the header packet generator 5 generates the header packet PHP for instructing the insertion point at which the second multimedia data stream is inserted. Further, in the present embodiment according to the present invention, the packet IHP for instructing invalidity of reproduction of the multimedia data, as explained in the example of FIG. 9 is generated.

Accordingly, when the second multimedia data stream is inserted to the first multimedia data stream stored in the multimedia data storage device 31, the header packet exchange and insertion device 6 inserts the header packet PHP showing the insertion point generated in the header packet generator 5 as explained above.

Further, the header packet exchange and insertion device 6 inserts the packet IHP at the position of front and behind of the header packet PHP as described in the diagram.

Then, the multimedia data inserted by the header packet exchange and insertion device 6 is transmitted to the data stream transmitter 4.

Thereby, when multimedia data is discontinuously generated on a point of switching the streams, in which the multimedia data stream is replaced or is inserted, it is possible to make it invalid to reproduce the multimedia data in front and behind of the point, on which the multimedia data is discontinuously generated with the use of the above-described packet IHP having a condition for inhibition of reproduction.

Accordingly, it becomes possible to prevent the reproduction and display of multimedia data from being deteriorated in the point at which the multimedia data is discontinued.

Figure 14:
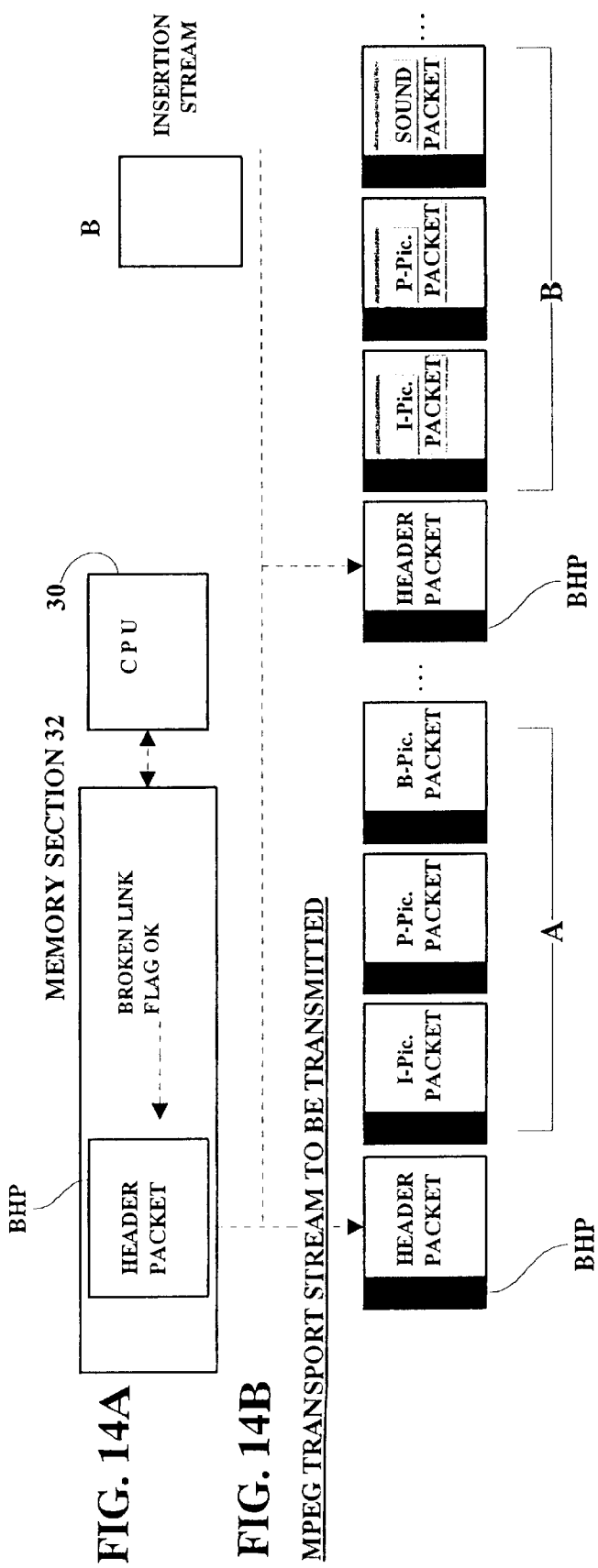
FIGS. 14A and 14B are diagrams of an example of solving a problem of discontinuous replay caused by inserting data streams with the use of a flag of a broken link.

FIGS. 14A and 14B show an example with the use of a flag of a broken ring. This example may prevent the reproduction and display of the multimedia data from being deteriorated in the point at which the data is discontinued, in the case where one multimedia data stream is switched to the other multimedia data stream for a moving picture group during the reproduction of the one multimedia data stream.

The header packet arranged at a head position of a moving picture group provided in front or behind of the switching point at which the first multimedia data stream A is switched to the second multimedia data stream B is exchanged to the header packet BHP, which makes the flag of the broken link for inhibition of reproduction of the moving picture data and sound data of coded difference between frames in front and behind of the switching point.

If the second multimedia data stream is inserted or replaced to the first multimedia data stream as described above, it becomes necessary to inform the reception terminal of the end of the insertion or the replacement on the reception terminal.

Figure 15:
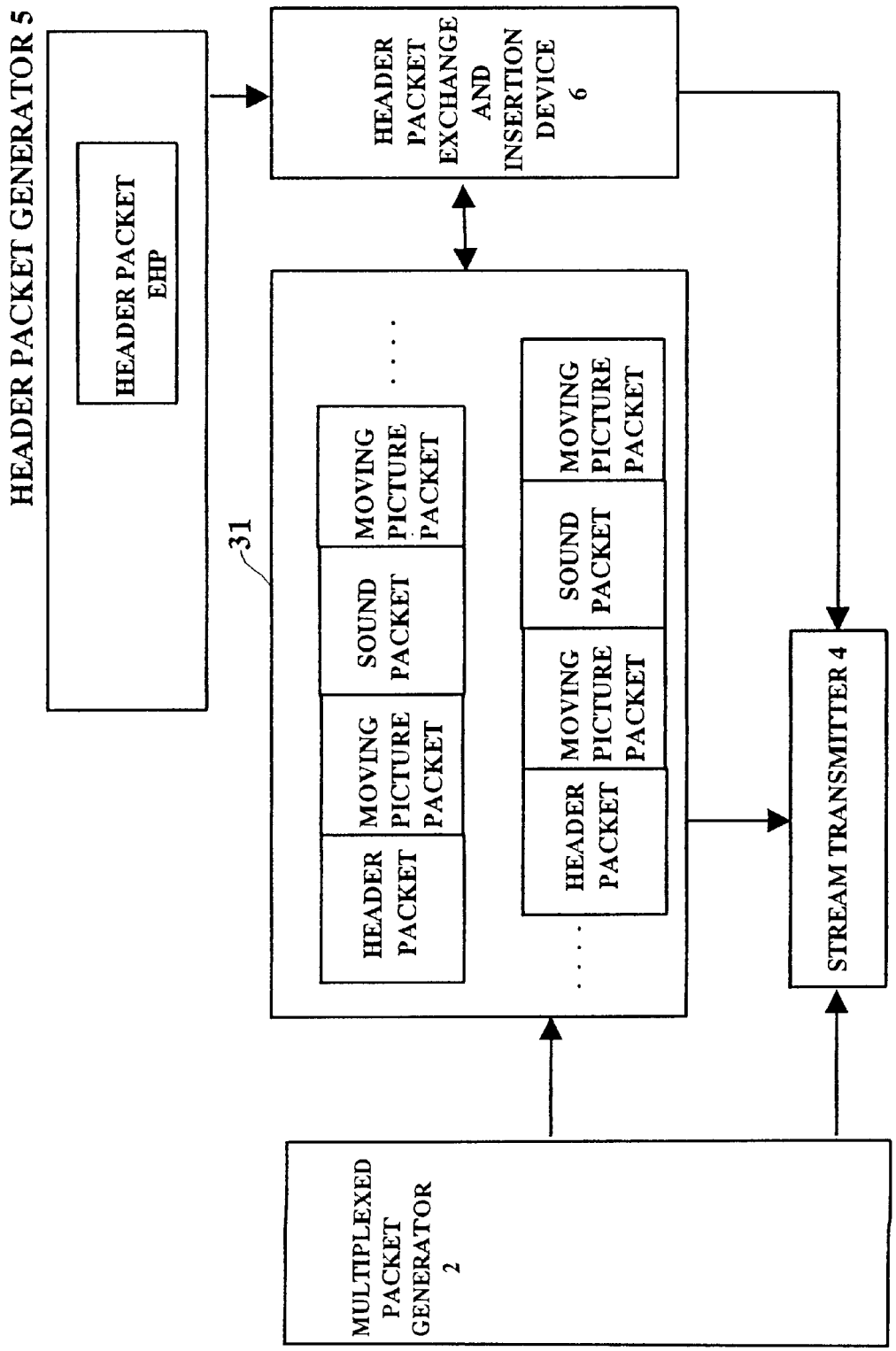
FIG. 15 is a structural diagram of informing end of insertion and replacement of data stream to a reception terminal side.

FIG. 15 is an example for informing the end to the reception terminal. That is, the header packet generator 5 generates a header packet EHP instructing the end.

The header packet exchange and insertion device 6 inserts the header packet EHP in an appropriate position of a multimedia data stream, and the data stream transmitter 4 transmits it. Therefore, it is possible for the reception terminal to know the end of insertion and replacement of the multimedia data stream.

Figure 16A:
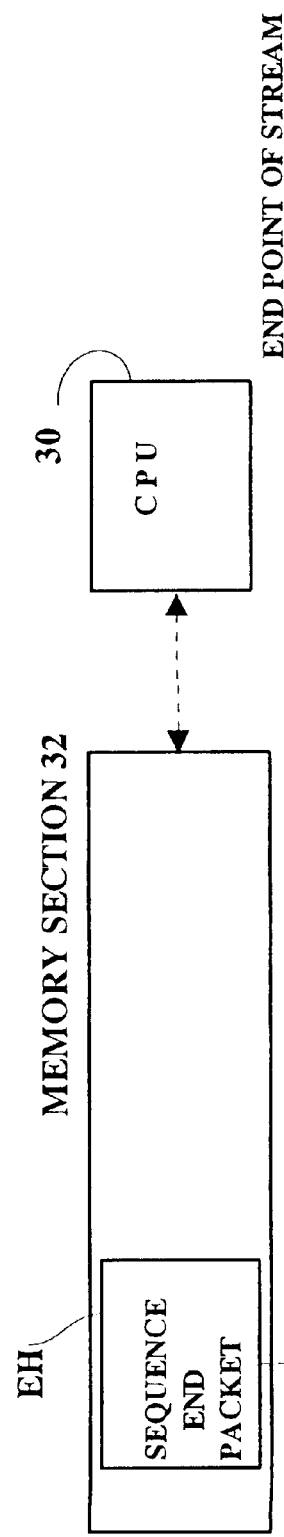
FIGS. 16A and 16B are diagrams of one example of recognizing end of insertion or end of replacement of the data stream according to end information header packet EHP.
Figure 16B:
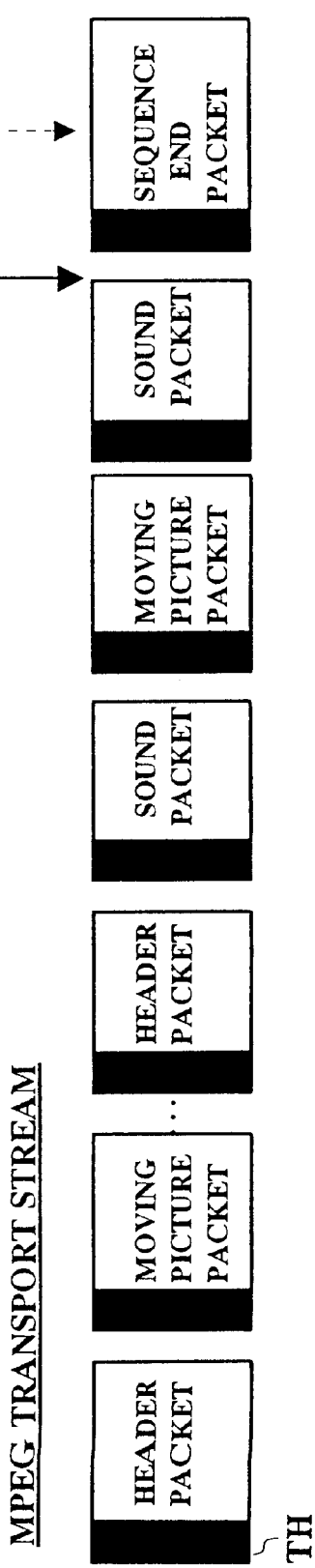

FIGS. 16A and 16B show diagrams for explaining the above-described case. The CPU 30 executes the functions of the header packet generator 5 and the header packet exchange and insertion device 6, and the memory section 32 in the video server 3 stores the generated header packet EHP instructing the end.

Then, during reproduction of the multimedia data stream, the header packet EHP is inserted or replaced at the point of the end of the inserted or replaced multimedia data stream, and is transmitted to the reception terminal.

Figure 17:
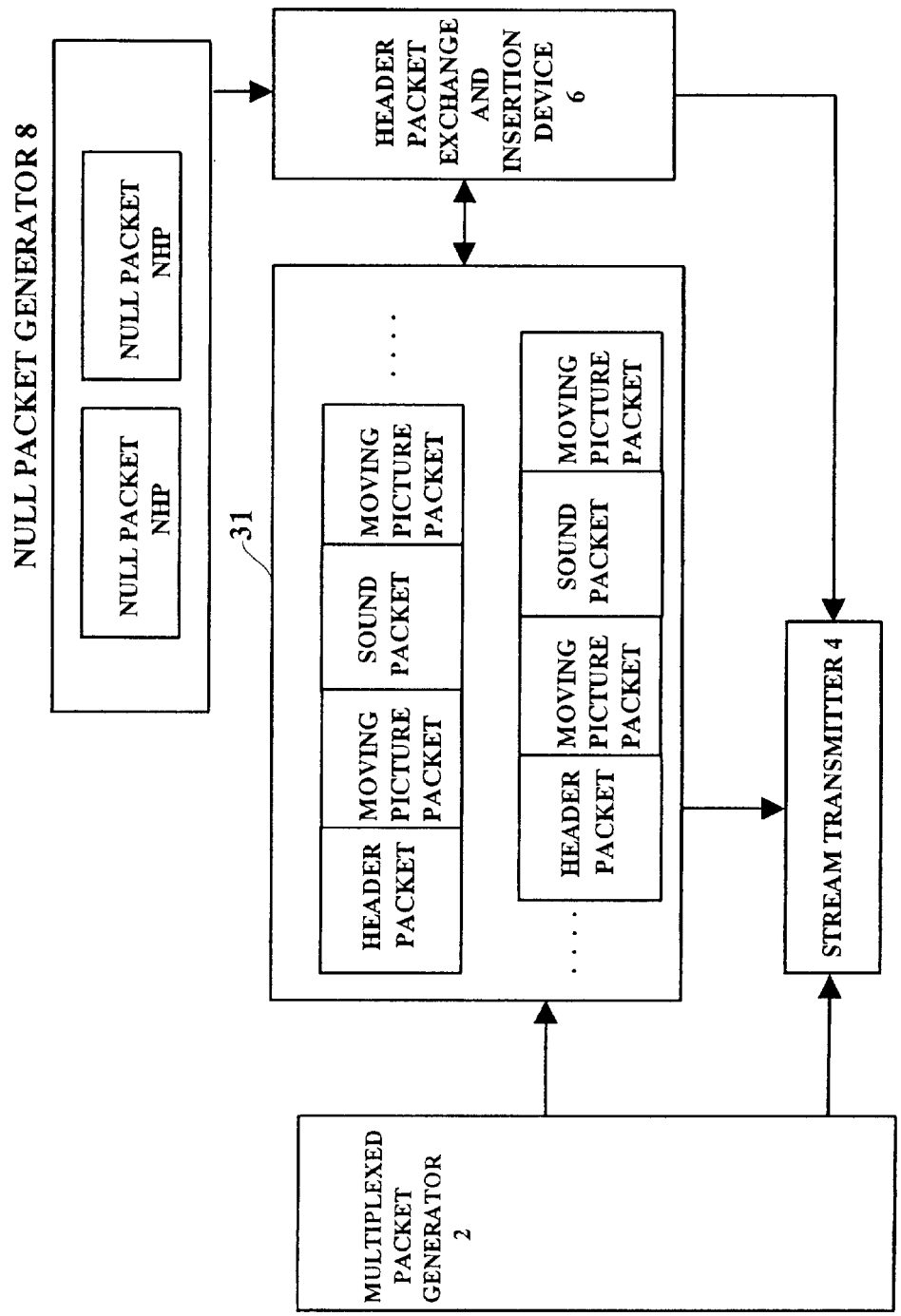
FIG. 17 is a diagram of an applied example of the present invention with the use of an invalid packet (Null packet).

FIG. 17 shows a principle diagram of a further embodiment employing the present invention. When the multiplexed packet generator 2 forms the data generated by the multimedia data generator 1 into a packet, the header packet generator 5 generates and stores a null packet NHP.

Then, the header packet exchange and insertion device 6 inserts the null packet NHP to the point at which the packet of other data stream is likely inserted in the future in the multimedia data stream stored in the multimedia data storage device 31. The device 6 concurrently transmits multimedia data inserted with the null packet to the data stream transmitter 5.

FIGS. 18A and 18B are diagrams for further explaining the above-described example. As well as the other examples, the CPU 30 executes the functions of the header packet generator 5 and the header packet exchange and insertion device 6. The memory section 32 stores the generated null packet NHP.

When the multimedia data stream is stored in the disk memory 31, the null packet NHP is inserted to the point, in which the packet of the other data stream is likely inserted in the future, per a moving picture group. In this way, the inserted multimedia data stream is transmitted to the reception terminal via the data stream transmitter 5.

The above-described null packet NHP becomes invalid on the reception terminal side. Therefore, even if the null packet NHP is inserted to various kinds of places in the moving picture data, sound data, and multiplexed stream data, it becomes possible to correctly reproduce according to time information on the reception terminal without changing time information and the size of the stream.

On the above-described explanation, the reception terminal may be constructed so as to have a function corresponding to the instruction described in the header packet generated in the header packet generator 5 or the CPU 30 according to each example.

As explained above in accompanying with the embodiments, the present invention may improve the effectiveness in performance of the data stream transmitter, requests for special reproduction on the reception terminal, insertion and replacement of other stream, information of the end of the stream as satisfied, holding the time information of the stream. Therefore, the present invention contributes to improve performance of a storage device storing the moving picture data, sound data, and multiplexed stream data.

As described above, in the present invention, the multimedia data stored in the multimedia data storage device is separated to the header information and the data to form into packets. Concurrently, a plurality of the multimedia data corresponding to the various kinds of transmission systems, in which the header packet is likely transmitted, and the reproduction system on the reception terminal have to be replaced in advance.

Thereby, it becomes possible to improve the accuracy and flexible reproduction on the reception terminal in the case where the multimedia data transmitter transmits the data to the data stream transmitter. If the packets showing the start and the end of the multimedia data stream are provided as the header packet, it further becomes possible to recognize the start and end of the stream without processing timer in the reception terminal.

The present invention may be embodied in other specific forms without departing from the sprit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for storing and transmitting multimedia data comprising the steps of:

generating multiplexed moving picture data, multiplexed sound data, and multiplexing information;

generating headers respectively for the multiplexed moving picture data and the multiplexed sound data, according to the multiplexing information;

converting the headers, the multiplexed moving picture data and the multiplexed sound data respectively into header packets and data packets for the multiplexed moving picture and sound data;

storing the header packets and the data packets independently; and transmitting the header packets as followed by the data packets.

2. The method according claim 1, wherein the header packets include information indicating how the data packets are processed.

3. The method according to claim 1, wherein the header packets, and the data packets are continuously transmitted per a predetermined unit.

4. The method according to claim 1, wherein only special packets of the header packets, and the data packets for the multiplexed moving picture data, and sound data are selected and transmitted.

5. The method according to claim 1, further comprising the steps of:

generating special header packets having information of play back condition of the multiplexed moving picture data, and the multiplexed sound data in reception terminals;

replacing header packets of the multiplexed moving picture data, and the multiplexed sound data with the generated special header packets; and transmitting the data packets for the multiplexed moving picture data, and sound data along with the generated special header packets.

6. The method according to claim 1, wherein a header packet including information relating to an insertion of one multimedia data stream stored near inserted or replaced position in advance in replaced or inserted, when the one multimedia stream is inserted or replaced to an original data stream of the data packets and the header packets for the multiplexed moving picture data, and the sound data.

7. The method according to claim 6, wherein a special header packet, in which instruction for inhibition of play back of the multiplexed moving picture data, and sound data of the original multimedia data stream connecting to an insertion or replacement point of the one an multimedia data stream, is generated, and the header packet of the original multimedia data stream, in which the one multimedia data stream is inserted or replaced, is replaced to the generated special header packet.

8. The method according to claim 6, a special header packet informing the end of the inserted or replaced, one multimedia data stream is generated, and a header packet in the end point of the inserted or replaced, one multimedia data stream is replaced to the generated special header packet.

9. The method according to claim 1, wherein a null packet, which is discarded in the reception terminal, is generated and is replaced to a header packet in the point where other multimedia data stream of the multimedia data stream including the header packets for the multiplexed moving picture data, and sound data is inserted or replaced.

10. A multimedia data storing and transmitting device comprising:

a multiplexed data generator generating multiplexed moving picture data, multiplexed sound data, and multiplexing information;

a header generator generating headers respectively for the multiplexed moving picture data and the multiplexed sound data according to the multiplexing information;

a converter converting the headers, the multiplexed moving picture data and the multiplexed sound data respectively into the header packets and data packets for the multiplexed moving picture and sound data;

a storing circuit storing the header packets and the data packets independently; and a transmitter transmitting the header packets as followed by the data packets.

11. The multimedia data storing and transmitting device according to claim 10, wherein the header packets include information indicating how the data packets are processed.

12. The multimedia data storing and transmitting device according to claim 10, further comprising:

a CPU; and a data stream transmitter continuously transmitting the header packets, and the data packets per a predetermined unit.

13. The multimedia data storing and transmitting device according to claim 10, further comprising:

a selector for selecting special packets of the header packets, and the data packets for the multiplexed moving picture data, and sound data, wherein the transmitter transmits only the selected special packets.

14. The multimedia data storing and transmitting device according to claims 10, further comprising:

a header packet generator generating a special header packet having condition of playing back the multiplexed moving picture data, and sound data in reception terminals; and a header packet exchange and insertion device replacing the header packets of the multiplexed moving picture data, and sound data with the generated special header packets wherein the transmitter transmits the data packets for the multiplexed moving picture data, and sound data along with the generated special header packets.

15. The multimedia data storing and transmitting device according to claim 10, further comprising:

a header packet exchange and insertion device replacing the header packet, which is in a position to be inserted or replaced, with a special header packet, which specifies the insertion of one multimedia data stream, when the one multimedia data stream is inserted or replaced to an original multimedia data stream having the data packets and the header packets for the multiplexed moving picture data, and sound data.

16. The multimedia data storing and transmitting device according claim 15, further comprising:

a header packet generator generating a special header packet including instruction of inhibition of playing back the multiplexed moving picture data, and sound data of the original multimedia data stream connecting to a point for insertion and replacement of the second multimedia data stream, wherein the header packet exchange and insertion device replaces the header packet of the original multimedia data stream, in which the one multimedia data stream is inserted or replaced with the special header packet.

17. The multimedia data storing and transmitting device according to claim 15, wherein the header packet generator generates a special header packet indicating the end of the one multimedia data stream, to be inserted or replaced, and replaces the header packet in the end position of the one multimedia data stream to be inserted or replaced by the header packet exchange and insertion device with the special header packet indicating the end of the one multimedia data stream.

* * * * *